(12) United States Patent
Buron et al.

(10) Patent No.: US 8,458,053 B1
(45) Date of Patent: Jun. 4, 2013

(54) CLICK-TO BUY OVERLAYS

(75) Inventors: Florian Buron, Zurich (CH); Chirayu Krishnappa, San Francisco, CA (US); BethEllyn McClendon, Portola Valley, CA (US); Jasson Schrock, Mountain Vew, CA (US); Johan Tibell, Zurich (CH); Thai Tran, Redwood City, CA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 12/641,312

(22) Filed: Dec. 17, 2009

Related U.S. Application Data (60) Provisional application No. 61/138,495, filed on Dec. 17, 2008.

(51) Int. Cl.
*G06Q 30/00* (2012.01)

(52) U.S. Cl.
USPC ... 705/27.1; 705/14.4; 705/14.51; 705/14.72; 705/26.1; 705/26.61; 705/51; 705/54

(58) Field of Classification Search
USPC ............... 705/26, 27, 26.1–27.2, 14.4, 14.51, 705/14.72, 51–59; 725/60
See application file for complete search history.

(56) References Cited

U.S. PATENT DOCUMENTS

| | | | |
|---|---|---|---|
| 6,615,408 B1 | 9/2003 | Kaiser et al. | |
| 7,870,025 B2 * | 1/2011 | English | 705/14.49 |
| 2002/0128981 A1 * | 9/2002 | Kawan et al. | 705/67 |
| 2003/0055723 A1 * | 3/2003 | English | 705/14 |
| 2007/0073599 A1 * | 3/2007 | Perry et al. | 705/27 |
| 2008/0103879 A1 | 5/2008 | Armstrong | |
| 2008/0140523 A1 * | 6/2008 | Mahoney et al. | 705/14 |
| 2008/0240490 A1 | 10/2008 | Finkelstein et al. | |
| 2009/0006375 A1 * | 1/2009 | Lax et al. | 707/5 |
| 2009/0094104 A1 * | 4/2009 | Anuar | 705/14 |
| 2009/0157450 A1 | 6/2009 | Athsani et al. | |
| 2009/0172746 A1 * | 7/2009 | Aldrey et al. | 725/61 |
| 2009/0196465 A1 | 8/2009 | Menon | |
| 2011/0289598 A1 | 11/2011 | Chastagnol et al. | |
| 2012/0030031 A1 | 2/2012 | Armstrong | |

OTHER PUBLICATIONS

Overlay.TV Announces GA of Interactive Online Video Platform with New Monetization System. Business Wire , p. NA , Sep. 4, 2008.*
Schonfeld, E., "Study: Pre-Rolls Suck. (But What's Better?)," TechCrunch Nov. 9, 2007, 2 pages, [online] [retrieved on Mar. 12, 2010] retrieved from the internet <URL:http://techcrunch.com/2007/11/09/study-pre-rolls-suck-but-whats-better/>.

(Continued)

*Primary Examiner* — William Allen
(74) *Attorney, Agent, or Firm* — Fenwick & West LLP (57) ABSTRACT

Methods and system for displaying a click-to-buy overlay for an item on a video in a video hosting site. The item is matched to the video according to video metadata and/or rules selected by the video rights holder. If the uploader is not the video rights holder, the video rights holder can choose to monetize the video by selecting Click-to-Buy metadata and/or rules. A viewer of the video can choose between multiple retailers for an item offered in the overlay. The viewer can further navigate between multiple overlays associated with the video while the video is playing.

16 Claims, 7 Drawing Sheets

OTHER PUBLICATIONS

Website for "Asterpix", Asterpix, Inc., 2010, 1 page, [online] [retrieved on Mar. 12, 2010] retrieved from the internet <URL:http://www.asterpix.com/>.

"Microsoft adCenter Labs, Audience Centric Internet Marking and Online Advertising, Video & Interactive, Video Hyperlink," Microsoft Corporation, 2008, 1 page, [online] [retrieved on Mar. 12, 2010] retrieved from the internet <URL:http://adlab.msn.com/Video-Hyperlink/Default.aspx>.

"Encore: Is Ooyala the Future of Advertising for Online Video?," Businesspov, Jan. 25, 2008, 2 pages, [online] [retrieved on Mar. 12, 2010] retrieved from the internet <URL:http://www.businesspov.com/article/248>.

Anonymous, "Forbes.com Redesigns Story Pages, Video Network Stock Quotes and Executive Tear Sheets," Business Wire, Dec. 11, 2008, 2 Pages.

* cited by examiner

CLICK-TO BUY OVERLAYS

CROSS-REFERENCE TO RELATED APPLICATIONS

This application claims the benefit of U.S. Provisional Application No. 61/138,495, filed on Dec. 17, 2008, which is incorporated by reference herein in its entirety.

BACKGROUND

1. Technical Field

Embodiments of the present invention generally relate to allowing users to buy items via the Internet and to enabling video rights owners to monetize their videos. In particular, the present invention is directed toward allowing users to buy multiple types of items associated with a current video from one or more retailers.

2. Description of the Related Art

A video being watched online often includes both video and audio content. Many videos also have one or more associated performers. Some videos have producers or teams associated with them, which may or may not appear in the videos. For example, a homemade video may have performers performing in the video and may also have performers performing the soundtrack in the background of the video. Thus, a viewer watching a video may be interested in various aspects of the video. Moreover, the items that the viewer wants to buy may be available from multiple retailers.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
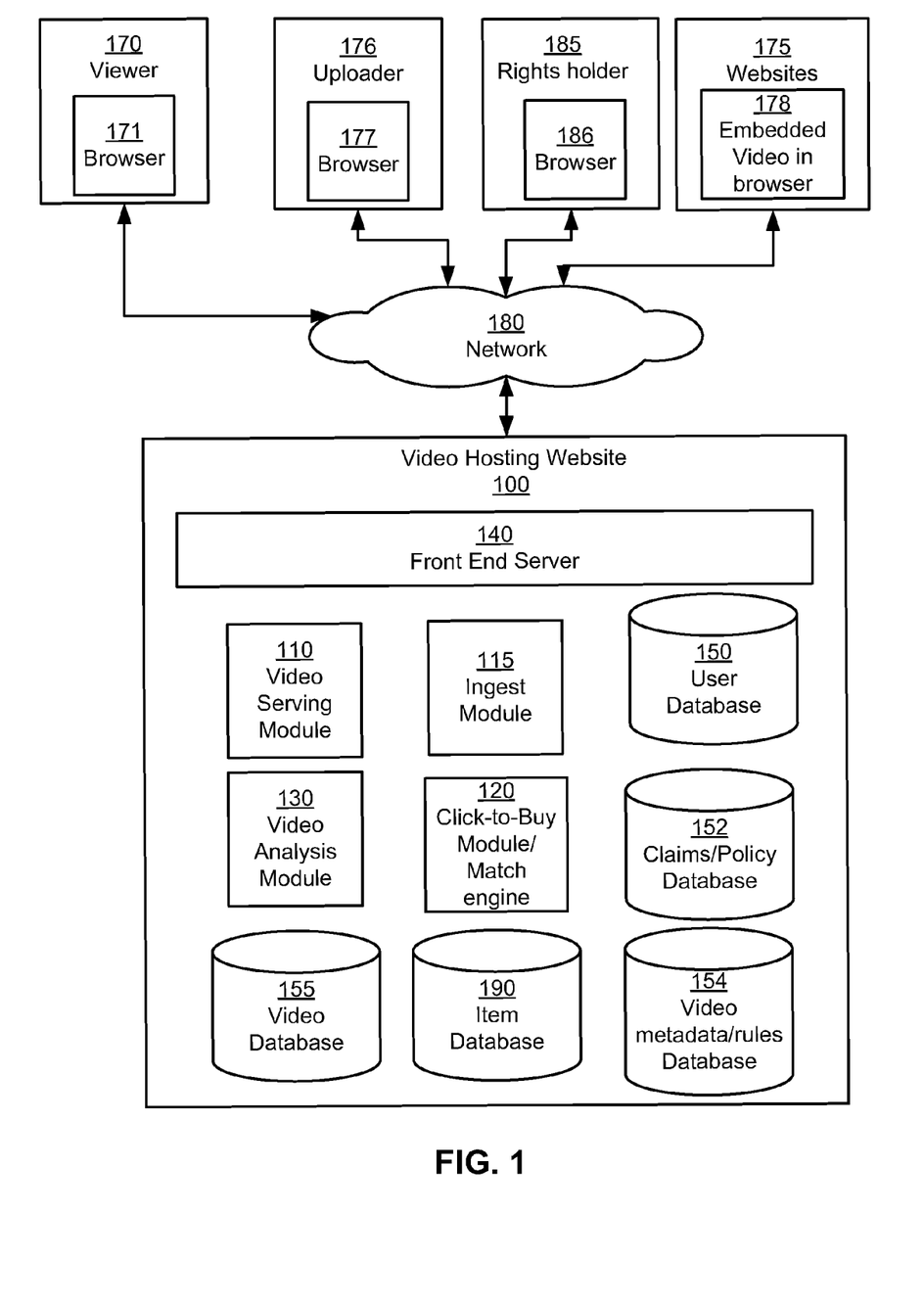
FIG. 1 is a block diagram of a system architecture of one embodiment of the present invention.

FIG. 1 illustrates a system architecture of an embodiment of a video hosting website 100. As shown in FIG. 1, the video hosting website 100 includes a video serving module 110, an ingest module 115, a Click-to-Buy module 120, a video analysis module 130, a front end server 140, a user database 150, a video database 155, a Claims/Policy database 152, a video metadata/rules database 154, and an item database 190. Many conventional features, such as firewalls, load balancers, application servers, failover servers, site management tools and so forth are not shown so as not to obscure the features of the system. A suitable website for implementation of the system is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

A server as referred to here can be implemented as server program executing on server-class computer comprising a CPU, memory, network interface, peripheral interfaces, and other well known components. The computers themselves preferably run an operating system such as LINUX, have generally high performance CPUs, several gigabytes of memory, and gigabytes, terabytes or even petabytes of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage media (RAM, hard disk, optical/magnetic media, etc.).

A client 170 executes a browser 171 to view digital content items and can connect to the front end server 140 via a network 180, which is typically the internet, but can also be any network, including but not limited to any combination of a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the video hosting website 100 at any time. The client 170 may include a variety of different computing devices. Examples of client devices 170 are personal computers, digital assistants, personal digital assistants, cellular phones, mobile phones, smart phones or laptop computers. As will be clear to one of ordinary skill in the art, the present invention is not limited to the devices listed above.

The browser 171 can include any application that allows users of client 170 to access web pages on the World Wide Web. Suitable applications are Microsoft Internet Explorer, Netscape Navigator, Mozilla Firefox, Apple Safari, Google Chrome, or any application adapted to allow access to web pages on the World Wide Web, including applications executed on mobile devices. The browser 171 can also include a video player (e.g., Flash™ from Adobe Systems, Inc.), or any other player adapted for the video file formats used in the video hosting website 100. Alternatively, videos can be accessed by a standalone program separate from the browser 171. A user can access a video from the video hosting website 100 by browsing a catalog of videos, conducting searches on keywords, reviewing play lists from other users or the system administrator (e.g., collections of videos forming channels), or viewing videos associated with particular user groups (e.g., communities).

A rights holder 185 is an entity that owns or administers at least some of the rights to a particular work. The rights holder 185 may be an individual, a group of individuals, or an entity such as a music or video production company or studio or artists' group. The rights holder 185 is responsible for providing digital content items to the video hosting website 100 via browser 186 on the network 180. The rights holder 185 may also provide content through other means, for example by providing media directly to the operator of website 100, or by providing website 100 with access to the content stored at a specified location. The rights holder 185 determines digital content items that should be provided to the video hosting website 100 and that may be eligible to generate revenue on the video hosting website 100. Additionally, the rights holder 185 may also provide digital content items to the video hosting website 100 regardless of whether the digital content items are eligible to generate revenue. Additionally, rights holder 185 may be able to monetize content uploaded by others, as described below. While only one rights holder 185 is shown, it is understood that any number of rights holders are supported and can be in communication with the video hosting website 100 at any time.

The uploaded digital content items can include, for example, video, audio or a combination of video and audio. Alternatively, a digital content item may be a still image, such as a JPEG or GIF file or a text file. For purposes of convenience and the description of one embodiment, the uploaded digital content items will be referred to as a "video," "video files," or "video items," but no limitation on the type of digital content items that can be uploaded are indented by this terminology. Thus, the operations described here for enabling monetization of a digital content item can be applied to any type of digital content, not only videos; other suitable types of digital content items include audio files (e.g. music, podcasts, audio books, and the like), documents, websites, images, multimedia presentations, and so forth.

As previously described, viewers 170 execute a browser 171 and connect to the front end server 140 to view the videos that have been provided by the rights holders 185. Users of client 170 can search for videos based on keywords or other metadata. These requests are received as queries by the front end server 140 and provided to the video serving module 110, which is responsible for searching the video database 155 for videos that satisfy the user queries and providing the videos to the users. The video serving module 110 supports searching on any fielded data for a video, including its title, description, metadata, author, category and so forth. Alternatively, users can browse a list of videos based on categories such as most viewed videos, sports, animals, or automobiles. For example, the user may browse a list of videos related to cars and select which videos from the list to view.

To upload videos to the video hosting website 100, an uploader 176 connects to the front end server 140 via the network 180. In FIG. 1, uploaders and rights holders are shown separately, although it should be understood that many uploaders are also rights holders and vice versa. We use the term uploader to signify a person who uploads a video and the term rights holder to signify someone who owns or administers rights in a video. It is possible for a person to be both a rights holder and an uploader for a particular video. It is also possible for a person to be only an uploader or only a rights holder for a particular video. Note also that rights to a video may actually be held by various different entities depending on the particular right in question and the geographic location—for example, the audio, video and sync rights may each be held by different rights holders, those rights holders may be different in the United States than they are in Europe. Note further that rights holders often designate other entities to administer their rights, and these other entities again often differ based on locality. For purposes of this discussion, however, in the interest of clarity we refer generally to "rights" in a video or other content item, and "rights holders" as those who own or administer those rights.

The uploaded videos are processed by an ingest module 115, which processes the videos for storage in the video database 155. This processing can include format conversion (transcoding), compression, metadata tagging, and other data processing. The ingest module 115 processes the videos in order to standardize content for playback to users of client 170. This enables the video hosting website 100 to receive uploaded videos of various formats, while still being able to provide a standardized output to users. An uploaded video file is associated with the rights holder 185 and the rights holder's account record is updated in the user database 150 as needed as is described in more detail in connection with FIG. 4.

The video database 155 is used to store the ingested videos. The video database 155 stores video content and associated metadata provided by their respective content owners. Each uploaded video is assigned a video identifier (ID) when it is processed by the ingest module 115. In addition to the video ID, the video files have associated metadata such as artist, video title, label, genre, time length, and geo-restrictions that can be used for data collection or content blocking on a geographic basis. More of fewer items of metadata may be associated with video files at the discretion of the implementer.

The user database 150 maintains a record of all registered users of the video hosting website 100. Registered users include rights holders 185 and/or users who simply view videos on the video hosting website 100. Each rights holder 185 and/or individual user registers account information including, for example, login name, e-mail address and password with the video hosting website 100. This account information is stored in the user database 150.

Click-to-Buy Functionality

FIG. 1 also includes a Click-to-Buy/match engine module 120, which performs the Click-to-Buy functionality described below.

Figure 2:
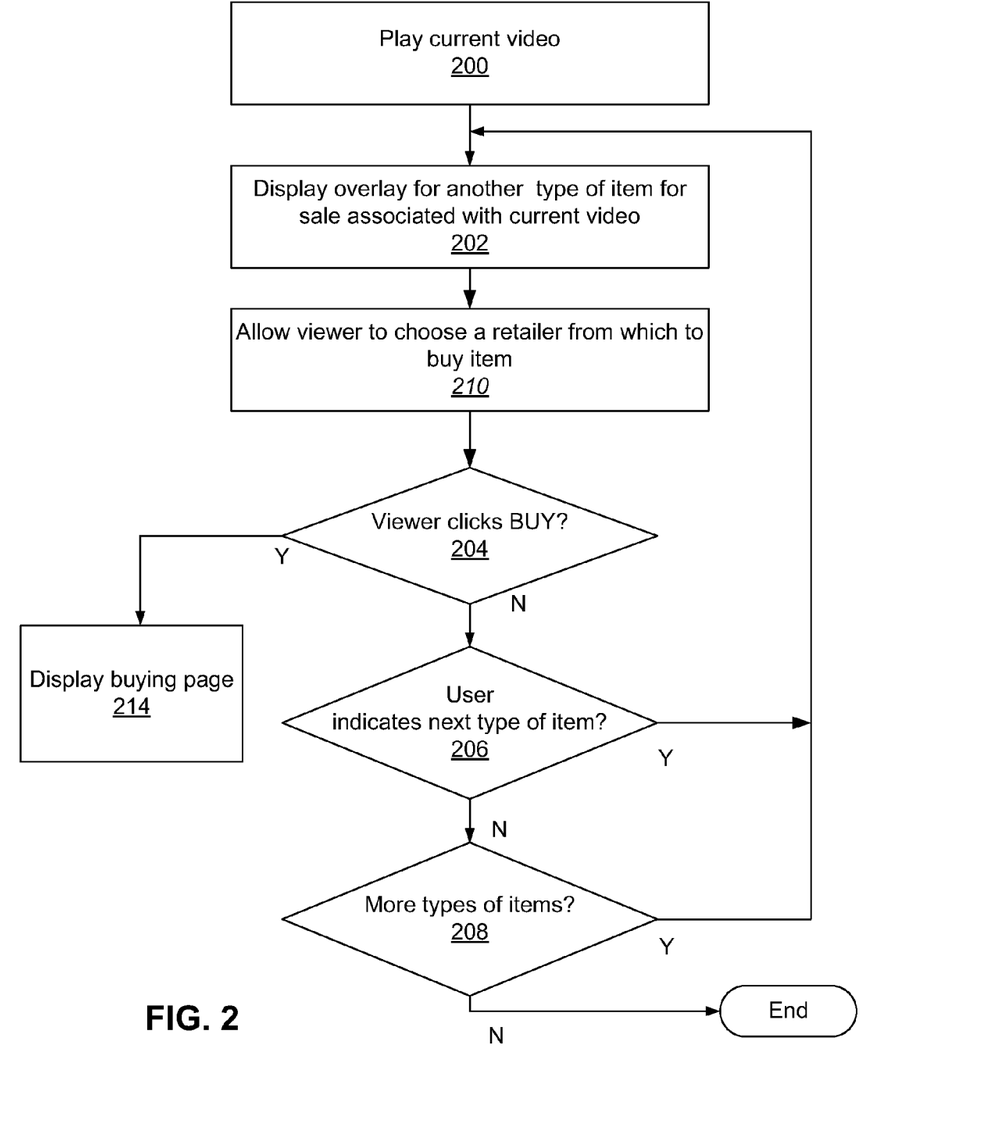
FIG. 2 is a flow chart illustrating a method for allowing a viewer to purchase items corresponding to various aspects of a video, where the items are available from multiple retailers.
Figure 3A:
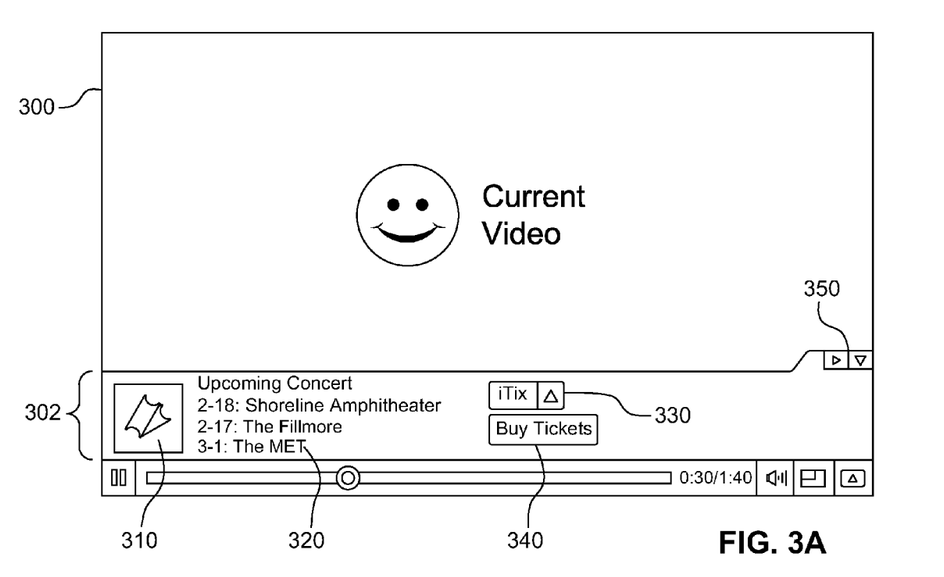
FIGS. 3-3d show screen shots in accordance with an embodiment of the present invention.

FIG. 2 is a flow chart illustrating a method for allowing a viewer to purchase items corresponding to various aspects of a video, where the items are available from multiple retailers. FIGS. 3a-3d show screen shots in accordance with an embodiment of the present invention. Initially, a viewer selects a current video 300 to be played and the video begins playing 200. In one embodiment, after a predetermined period of time, e.g., 15 seconds, the viewer is given an opportunity to purchase an item associated with the current video. In one embodiment, an overlay 302 appears on the bottom of the video. FIG. 3a shows an example of such an overlay 302.

In the illustrated example, overlay 302 of FIG. 3a gives a viewer an opportunity to purchase concert tickets for an artist who is associated with the current video. For example, the artist could be the singer for a background song, or could be the subject of the video itself. Overlay 302 includes an image 310 associated with the video, a list 320 of upcoming concerts by the video artist, a menu 330, such as a drop-down menu, that allows the viewer to select a retailer for the concert tickets, and a BUY button 340. Overlay 302 also includes previous and next buttons 350.

Continuing with FIG. 2, if the viewer clicks or otherwise selects the BUY button the viewer is sent 214 to a BUY page of the retailer associated with the retailer selected by the user. For example, if the viewer selects iTix as a retailer, from among the multiple retailers available, the viewer will be forwarded to a buy page owned, controlled, or specified by iTix when he clicks the BUY button 340. In one embodiment, this page is on a server controlled by the retailer. In other embodiments, this page is on a server controlled by the video site.

In one embodiment, if the viewer does not select the BUY button within a predetermined time 204, processing determines 206 whether the viewer has selected either the forward or next buttons 350. If one of the forward or next buttons has been selected 206, a different type of item (or a different item) is displayed 202 in the overlay as described below.

In one embodiment, if the viewer does not select the BUY button or the forward/next buttons, after a predetermined period of time (for example, 30 seconds or, for example, a predetermined percentage of the video run time), a next type of item is displayed 202 in the overlay if 208 more types of items remain.

Thus, the user can move between different items for sale that are associated with the video by using the previous/next buttons 350, or if the user does nothing, the various items are displayed in turn for preselected periods of time. In one embodiment, the various items are sold from a single source, such as a shopping site, that has won the right to display items/services for sale in connection with the video. In another embodiment, the various items are from multiple sources, such as a shopping site, a ticket site, etc.

In one embodiment, more than one of the various items are offered at the same time form the drop down menu.

In one embodiment, before the viewer clicks the BUY button 340, the viewer can choose 210 from among multiple retailers for the item being featured in overlay 320. Because the amount of space available in a video overlay is generally small, it is not always feasible to have multiple BUY buttons for multiple retailers, especially if there are many retailers for a particular item. Therefore, for example, a video may be available for purchase from multiple web sites. Menu 330 allows the viewer to select from among potential retailers from which to purchase an item.

In one embodiment, when the viewer dismisses the overlay, or if the viewer does not interact with the overlay within a predetermined time period, the overlay goes into a minimized state. One embodiment of this is a small "up arrow" icon that appears in the bottom right of the player. The viewer can click on this to bring back the overlay. Alternatively, this can appear as a "Show product info" button in the player chrome (the borders of the web browser window).

In some embodiments, the information described above as being in the click-to-buy overlay does not appear over the video. Instead, in some embodiments it appears in the player chrome or adjacent to the player, e.g., below or to the side.

Figure 3B:
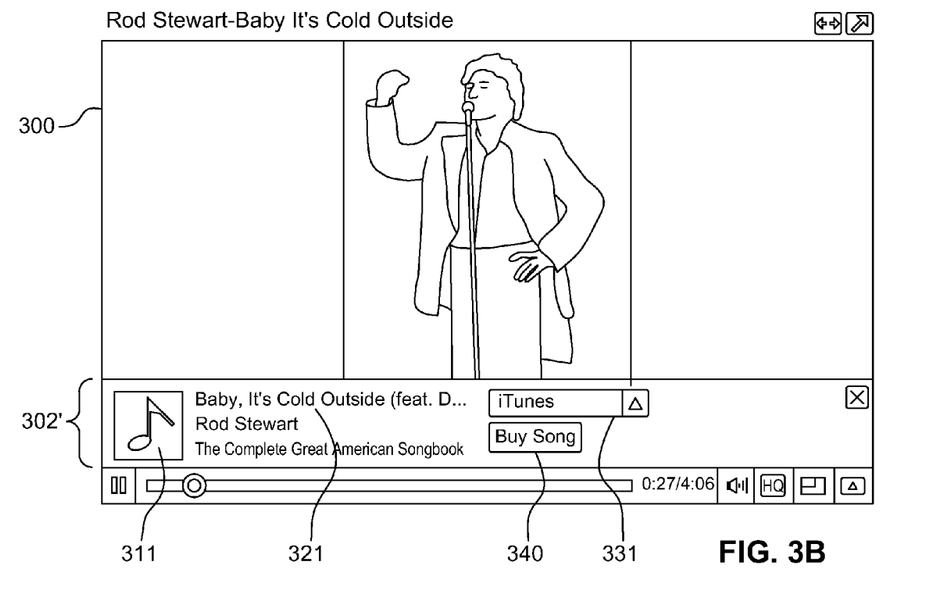

The following paragraphs describe some types of items that may be available for purchase. Overlay 302' of FIG. 3b gives a viewer an opportunity to purchase an audio recording associated with the current video. For example, the audio recording could be a background song on the current video or, for example, could be a song by a person appearing in the video, even though the song itself does not appear in the video. Overlay 302' includes an image 311 associated with the audio recording, a description 321 of the audio recording, a menu 331, such as a drop-down menu, that allows the viewer to select a retailer for the audio recording, and a BUY button 340. Overlay 302' also includes previous and next buttons (not shown) in various embodiments, as illustrated with respect to FIG. 3a.

Figure 3C:
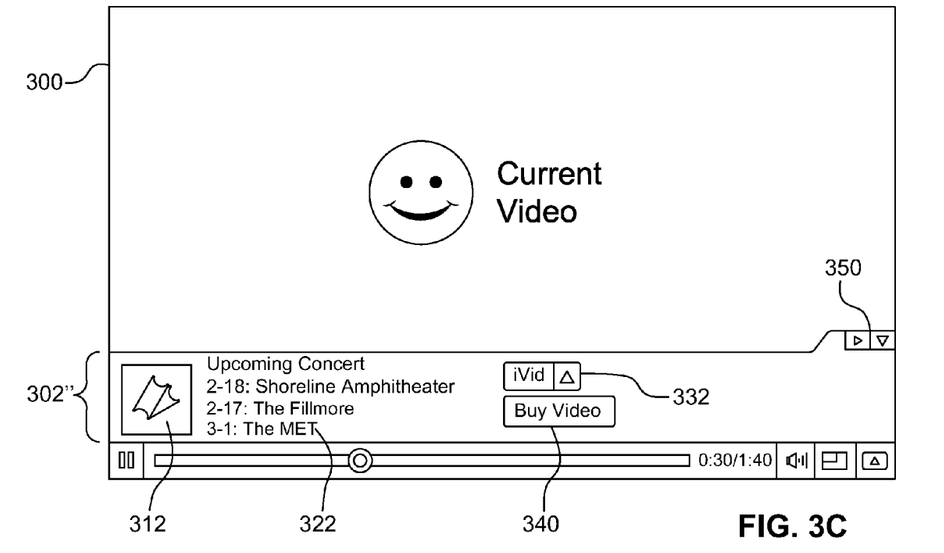

Overlay 302" of FIG. 3c gives a viewer an opportunity to purchase a video associated with the current video. For example, the video could be the current video itself or, for example, could be a video related to the current video, such as a video starring the same characters. Overlay 302" includes an image 312 associated with the video, a description 322 of the video, a menu 332, such as a drop-down menu, that allows the viewer to select a retailer for the video, and a BUY button 340. Overlay 302" also includes previous and next buttons 350.

Figure 3D:
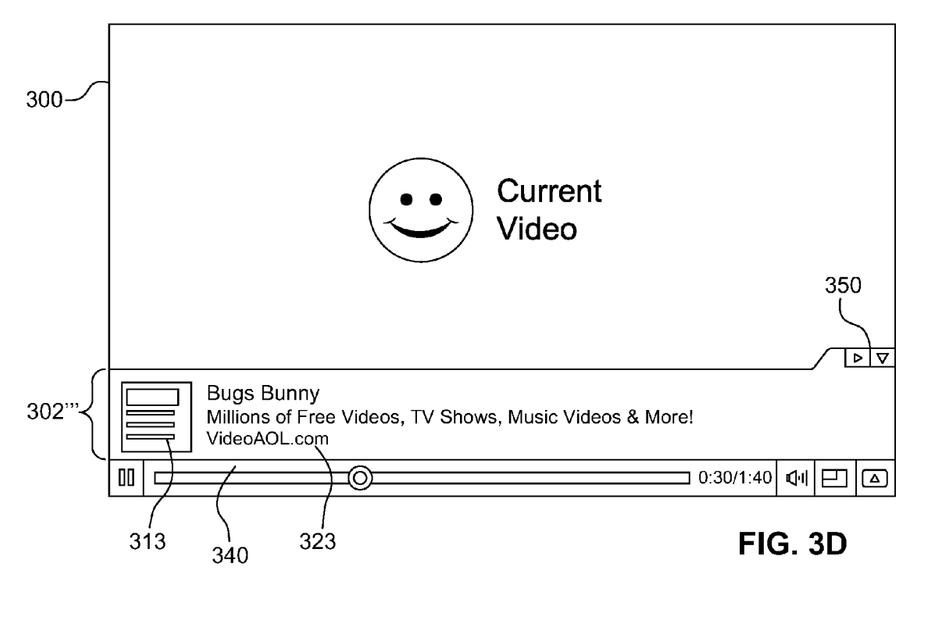

Overlay 302' of FIG. 3d gives a viewer an opportunity to purchase an item related to the current video. For example, the related item could be a product shown in the video or, for example, could be a shirt bearing the likeness of a person appearing in the video. Overlay 302' includes an image 313 associated with the related item, a description 323 of the related item, and a BUY button 340, which may be in the form of a link to a purchasing page as noted above. Overlay 302' also includes previous and next buttons 350. In one embodiment, a dropdown menu appears if there are multiple retailers offering the same product, which is not the case in this figure.

In the described embodiment, overlay 302 is displayed within the video using built-in functionality of a client-side Flash player. The UI shown can be implemented using any number of known technologies, including but not limited to HTML, Javascript, Java, or Actionscript. Thus, when the video is transmitted to a client player, the server further instructs the client player to display, during a time period when the video is playing, an overlay offering the item for sale; to allow a viewer of the video to select among multiple retailers from which the item can be purchased; and to allow the viewer to purchase the item from the selected retailer. In other embodiments, the server instructs the client device to display Click-to-Buy overlays as described herein.

Figure 4:
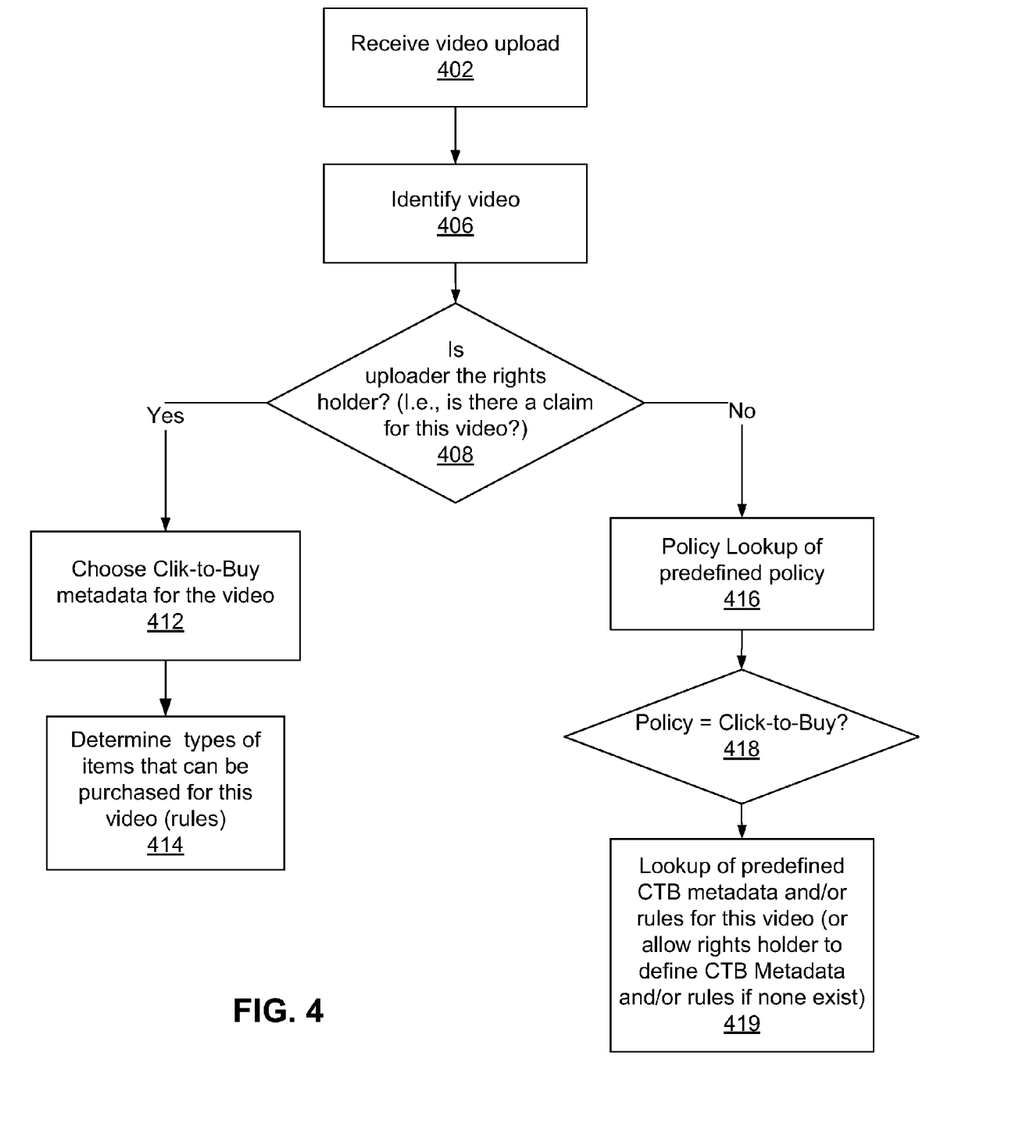
FIG. 4 is a flow chart illustrating a method for allowing an uploader or a rights holder to choose types of items that can be offered in conjunction with a video.

FIG. 4 is a flow chart illustrating a method for allowing an uploader or a rights holder to choose types of items that can be offered in conjunction with a video. The method of FIG. 4 in one embodiment is performed when a video is uploaded 402 to video hosting site 100, although in other embodiments it is performed at a time after the upload, for example, as a process performed on a group of previously uploaded videos.

In FIG. 4, the uploaded video is identified 406. This can be done, for example, via analysis engine 130 using fingerprint matching against a collection of reference videos using any known method. A video can also be identified by supplied metadata, such as a title, author, running time, etc., for example when the video is received from a trusted uploader.

Once the video is identified, system 100 determines 408 whether the uploader is also the rights holder. In one embodiment, this is done by checking claims database 152 to see whether a rights holder has entered a claim for the identified uploaded video.

If the uploader is also a rights holder 408, the uploader/rights holder can choose 412 which types of items will be advertised against the video (other videos, audio, concert tickets, movie tickets, related items, etc.). The uploader/rights holder can also, in some embodiments, define or choose rules 414 limiting the items that can be sold on the video (e.g., no items sold on videos played in Canada). In one embodiment, the rights holder may optionally specify specific products or items that they have a relationship with and that they want to appear as retailers, either exclusively or non-exclusively.

Figure 6:
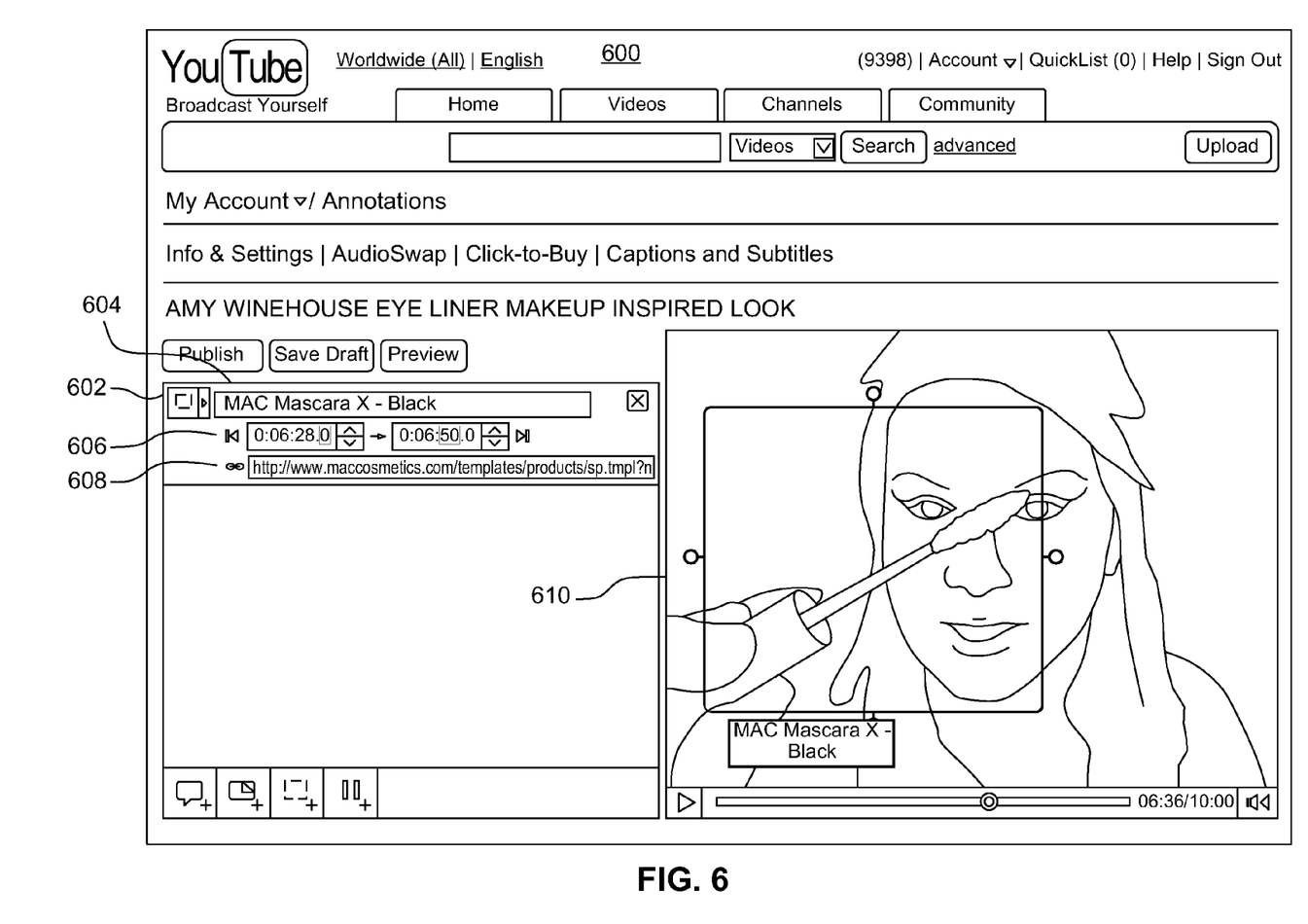
FIG. 6 is a screen shot showing a user interface used by a rights holder.

FIG. 6 is a screen shot showing a user interface used by a rights holder. In one embodiment, the rights holder can tag specific items that appear within the video and the time period within the video that they appear. The click-to-buy overlay is then shown at the point in the video where the item appears. A tool 602 allows the rights holder to select a portion of the video (here a mascara wand in area 610). The rights holder enters a tag for the identified item in area 604 and a time period within the video that the overlay should appear 606. A link 608 can be used to embed the video in an embedded player.

As a further example of rules, if the video is a music video by Britney Spears, the uploader/rights holder may choose metadata such as "Britney," "Britney Spears," "Circus" and may also identify the title, Artist, and ISRC (International Standard Recording Code) of the video. In addition to choosing metadata, in some embodiments, the uploader is allowed to specify the types of items that can be advertised with the video by specifying rules. These rules, for example, can take the form of a whitelist or a blacklist. For example, the uploader may specify: sell any videos or audio recordings, do not sell items by Artist X, sell only items by artist X, sell only items from a particular retailer or other similar rules. In some embodiments, this choice of rules is made on a per-uploader basis so that all videos of the uploader have the same rules. In other embodiments, it is made on a per-video basis so that an uploader may assign different rules to different ones of its videos. In other embodiments, rules are specified on a per-video/per-geographic location basis.

Referring again to FIG. 4, if the uploader is not 408 a rights holder, the rights holder has an opportunity to monetize the video by having a Click-to-Buy overlay. The rights holder determines how its videos are treated on the site. For example, a rights holder may have previously defined a policy controlling how the video will be treated on the site if it is uploaded by a person who is not the rights holder. Possible values for such a policy include but are not limited to:

- takedown, which causes the video to be removed
- monetize (i.e., revenue share in ads revenue paid by advertisers on the video)
- block, which leaves the video on the site but blocks access to it by the public
- Click-to-Buy (described in detail herein)
- offer for sale
- offer for rent
- same policies listed above, but with geographic limitations If a rights holder has chosen Click-to-Buy as the policy for the identified video 416/418, a lookup is performed to determine what metadata and rules the rights holder has previously defined for the identified video 419 when Click-to-Buy is implemented for the video. In some situations, a rights holder may have made a claim but not specified metadata and rules. In such a situation, the rights holder is given an opportunity to specify Click-to-Buy metadata and rules before the video is posted to the video site.

Figure 5:
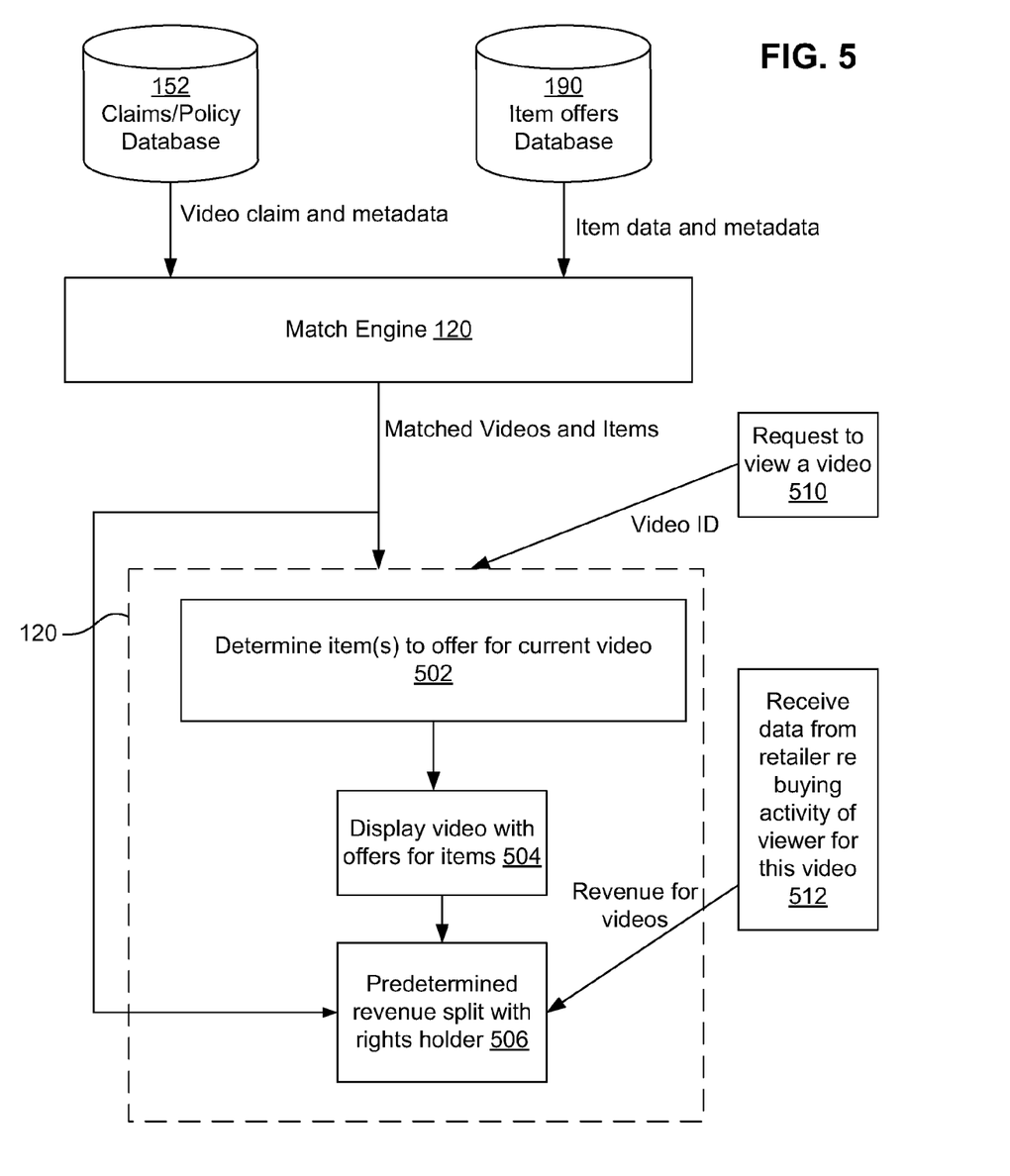
FIG. 5 is a flow chart illustrating a method for matching videos of rights holders with items to be offered, displaying the matched items and videos, and performing a revenue split between the rights holder and the video site.

FIG. 5 is a flow chart illustrating a method for matching videos of rights holders with items to be offered, displaying the matched items and videos, and performing a revenue split between the rights holder and the video site.

FIG. 5 shows database 190 containing items that retailers wish to sell via click-to-buy. For an item, this database contains item metadata, such as the ISRC of specific videos that the retailer wishes to place overlays on, or tag words with which the retailer wishes to associate his item. Thus, a retailer selling concert tickets for a particular performer may have associated tags such as the ISRC of the performer's music videos, the name of the performer, and so forth with its item in database 190. FIG. 5 also shows a database 152 containing video claims and policies for videos owned by rights holders. Match engine 120 receives as input IDs of claimed videos from database 152 and IDs for items available for click-to-buy placement. In one embodiment, match engine matches videos with items using several different methods.

In one embodiment, a matching strategy involves identifying a perfect match according to a unique content ID such as an ISRC number. In an alternative embodiment, fuzzy matching can be performed using claim and product metadata, such as title, author, album, etc. In this embodiment, a Jaro-Winkler distance function, known in the art, is used on raw and normalized metadata to determine a product and claim similarity metric. This metric is then translated in one embodiment into a normalized score based on which the potential match can be accepted, rejected, or queued for manual review.

FIG. 5 shows additional steps 502, 504, and 506, all of which are included in Click-to-Buy module 120 of FIG. 1. When a viewer requests to view a current video, the request is received and module 120 determines 502 which items to offer as Click-to-Buy items for the current video in accordance with the prior output of match engine 120. As discussed above, the current video is displayed and one or more overlays for one or more items are displayed also. If a viewer follows a BUY link and makes a purchase, the retailer site that sells the item is able to identify the viewer/buyer and returns 512 data on the buying activities resulting from the click-through. In one embodiment, the tracking of sales is performed via a redirect to an "Affiliate Network" provider as follows:

1. The video host site 100 constructs a link to the Affiliate Network that encodes information in the URL such as the video ID, the video host site's own identification, and the URL of the product on the retailer's website.
2. Viewer clicks on the link and is sent to the Affiliate Network's servers.
3. The Affiliate Network then gives the viewer a cookie that encodes information such as that the viewer came from the video host site 100 and the video ID they were linked from.
4. The Affiliate Network then redirects the viewer to the product page on the retailer's website.
5. When the viewer purchases the item, the retailer puts a beacon on the checkout page that informs the Affiliate Network that a sale was completed—this beacon sends the cookie that the Affiliate Network gave to the viewer.
6. The Affiliate Network then attributes the sale to the referrer (video host site 100) in the viewer's cookie.

In other implementations, the video hosting site could charge the retailer CPM (cost per 1000 impressions) for displaying their link, or charge the retailer CPC (cost per click) for each click. In some embodiments, the video hosting site 100 may not always share revenue with the rights holder, such as cases where the retailer pays the rights holder for each purchase (e.g. when a song is sold by a third-party commercial website and percentage of the purchase price is paid to the music label).

The retailer also returns a portion of its revenue as a result of the sale. Module 120 divides revenues from the retailer/selling site between the video site and the rights holder. Some examples of ways in which revenues are distributed include but are not limited to: a percentage of revenue, a flat rate per sale above a minimum, an escalating percentage of revenue depending on the number of sales per video, a percentage of revenue based on geographic location of the buyer.

Thus, if many items for sale are matched with a video and the items are available from many retailers, a rights holder may receive revenue from the sales of multiple items and from multiple retailers for a single view of the video, assuming the viewer buys more than one item. As an example, if a viewer clicks on a BUY button in a Click-to-Buy overlay, the retailer is able to determine the origin of the visit to its buying site as being the video hosting site. After the purchase is completed, the retailer sends a portion of the sales price (or a predetermined amount) to the video hosting site, which gives a portion to the rights holder. Thus, the video hosting site must maintain records of which views resulted in trips to which retailer sites in order to be able to match received revenues with the rights holder of the viewed video.

As shown in FIG. 1, videos can also be shown in embedded players 178 that are embedded on third party web sites 175. Thus, rights holders can monetize not only videos that are played on a shared video site, but can also monetize videos that are played on large numbers of other sites. This embodiment assumes that the rights holder has agreed that its video can be shown on embedded players and has agreed to monetize using Click-to-Buy.

In various embodiments, the video hosting site transmits Click-to-Buy data to the video player on browser 171 or browser 178 in various ways, without limitation:

1. encoding the click-to-buy data in the URL of the Flash player.
2. When constructing the HTML page, passing the click-to-buy data as a parameter (a "flashvar") of the player.
3. When the player initializes, it makes a request to the video hosting site servers to get the click-to-buy data.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for collaboratively ranking a set of digital content items through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for displaying click-to-buy overlay advertising, comprising:
   receiving, at a client device, a video;
   displaying, on the client device during a time period when the video is playing, an overlay advertisement offering an item for sale and a first retailer from which the item can be purchased, wherein the item for sale matches the video in accordance with metadata of the video and metadata of the item for sale;
   displaying, within the overlay advertisement, a list of multiple alternative retailers from which the item can be purchased responsive to a first indication to display the list;
   displaying, within the overlay advertisement, only a second retailer from the list of multiple alternative retailers responsive to a selection of the second retailer from the list;
   displaying, within the overlay advertisement, the list of multiple alternative retailers responsive to a second indication to display the list;
   displaying, within the overlay advertisement, only a third retailer from the list of multiple alternative retailers responsive to a selection of the third retailer from the list; and
   receiving a selection to purchase the item from the third retailer.

2. The method of claim 1, further comprising:
   receiving input navigating among overlay advertisements of multiple items for sale while the video is playing.

3. The method of claim 2, where the input is received using previous item and next item buttons that are included in the overlay advertisement.

4. The method of claim 1, wherein the video and the item is matched in accordance with whitelist rules.

5. The method of claim 4, where the whitelist rules are rules applying to all videos of a rights holder.

6. The method of claim 1, wherein the video and the item is matched in accordance with blacklist rules.

7. The method of claim 6, wherein the blacklist rules are rules applying to all videos of a rights holder.

8. The method of claim 1, wherein revenue is divided between the third retailer and a right holder of the video.

9. The method of claim 1, wherein the video is displayed on an embedded player that is contained on a third party web site.

10. The method of claim 1, wherein the item comprises a concert ticket of an artist associated with the video.

11. The method of claim 1, wherein the item comprises an audio recording associated with the video.

12. The method of claim 1, wherein the item comprises a related video of the video.

13. The method of claim 1, wherein the item comprises a product shown in the video.

14. A computer program product for displaying click-to-buy overlay advertising, the computer program product stored on a non-transitory computer readable storage medium and including software code adapted to cause a processor to carry out the steps of:
   receiving, at a client device, a video;
   displaying, on the client device during a time period when the video is playing, an overlay advertising offering an item for sale and a first retailer from which the item can be purchased, wherein the item for sale matches the video in accordance with metadata of the video and metadata of the item for sale;

displaying, within the overlay advertisement, a list of multiple alternative retailers from which the item can be purchased responsive to a first indication to display the list;

displaying, within the overlay advertisement, only a second retailer from the list of multiple alternative retailers responsive to a selection of the second retailer from the list;

displaying, within the overlay advertisement, the list of multiple alternative retailers responsive to a second indication to display the list;

displaying, within the overlay advertisement, only a third retailer from the list of multiple alternative retailers responsive to a selection of the third retailer from the list; and receiving a selection to purchase the item from the third retailer.

15. A computer system for displaying click-to-buy overlay advertising, comprising:

a computer processor; and a computer-readable storage medium storing executable code, the code when executed by the computer processor causes the computer processor to:

receive a video;

display during a time period when the video is playing, an overlay advertisement offering an item for sale and a first retailer from which the item can be purchased, wherein the item for sale matches the video in accordance with metadata of the video and metadata of the item for sale;

display, within the overlay advertisement, a list of multiple alternative retailers from which the item can be purchased responsive to a first indication to display the list;

display, within the overlay advertisement, only a second retailer from the list of multiple alternative retailers responsive to a selection of the second retailer from the list;

display, within the overlay advertisement, the list of multiple alternative retailers responsive to a second indication to display the list;

display, within the overlay advertisement, only a third retailer from the list of multiple alternative retailers responsive to a selection of the third retailer from the list; and receive a selection to purchase the item from the third retailer.

16. The system of claim 15 wherein revenue is divided between the third retailer and a right holder of the video.

* * * * *

UNITED STATES PATENT AND TRADEMARK OFFICE
CERTIFICATE OF CORRECTION

PATENT NO. : 8,458,053 B1
APPLICATION NO. : 12/641312
DATED : June 4, 2013
INVENTOR(S) : Florian Buron et al.

Page 1 of 1

It is certified that error appears in the above-identified patent and that said Letters Patent is hereby corrected as shown below:

Title Page item 75 (Inventors), delete "Vew" and insert --View--.

Signed and Sealed this
Seventeenth Day of September, 2013

Teresa Stanek Rea
*Deputy Director of the United States Patent and Trademark Office*